(12) United States Patent
Yamayose

(10) Patent No.: US 9,028,741 B1
(45) Date of Patent: May 12, 2015

(54) METHOD FOR MANUFACTURING ALUMINUM-TITANATE-BASED CERAMIC HONEYCOMB STRUCTURE

(71) Applicant: Ibiden Co., Ltd., Ogaki-shi (JP)

(72) Inventor: Kazunori Yamayose, Stuttgart (DE)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 13/873,624

(22) Filed: Apr. 30, 2013

Related U.S. Application Data

(60) Provisional application No. 61/787,566, filed on Mar. 15, 2013.

(51) Int. Cl.
| | |
|---|---|
| B01D 46/00 | (2006.01) |
| B01D 46/24 | (2006.01) |
| B29D 99/00 | (2010.01) |
| C04B 38/00 | (2006.01) |

(52) U.S. Cl.
CPC .................................. C04B 38/0006 (2013.01)

(58) Field of Classification Search
CPC .... C04B 35/64; C04B 35/65; C04B 38/0012; C04B 35/10
USPC ......... 264/259, 269, 630–632, 364, 652–654, 264/661, 666, 177.12; 425/110, 113
See application file for complete search history.

(56) References Cited

U.S. PATENT DOCUMENTS

| | | | | |
|---|---|---|---|---|
| 5,433,904 | A * | 7/1995 | Noky ............................ | 264/40.1 |
| 7,427,309 | B2 * | 9/2008 | Ohno et al. ...................... | 55/523 |
| 7,611,560 | B2 * | 11/2009 | Ichikawa ......................... | 55/523 |
| 7,687,008 | B2 * | 3/2010 | Okazaki et al. ................ | 264/442 |
| 7,727,451 | B2 * | 6/2010 | Naruse et al. ................. | 264/296 |
| 7,833,606 | B2 * | 11/2010 | Suwabe et al. ................ | 428/116 |
| 7,976,768 | B2 * | 7/2011 | Brady et al. ................... | 264/630 |

(Continued)

FOREIGN PATENT DOCUMENTS

| | | |
|---|---|---|
| JP | 2009-543755 | 12/2009 |
| JP | 2010-522106 | 7/2010 |

OTHER PUBLICATIONS

U.S. Appl. No. 13/887,638, filed May 6, 2013, Yamayose.

(Continued)

*Primary Examiner* — Joseph S Del Sole
*Assistant Examiner* — Nahida Sultana
(74) *Attorney, Agent, or Firm* — Oblon, McClelland, Maier & Neustadt, L.L.P.

(57) ABSTRACT

A method for manufacturing a ceramic honeycomb structure includes kneading titania particles, alumina particles and a binder ingredient such that raw material paste including the titania particles, alumina particles and binder ingredient is prepared, forming a body made of the raw material paste and having a honeycomb structure such that the body has the honeycomb structure having multiple through-holes extending in the longitudinal direction of the body and multiple partition portions formed between the through-holes, applying sealant composition including aluminum hydroxide particles, talc particles, kaolin particles, water and organic binder to either end of each through-hole of the body in the longitudinal direction such that the honeycomb structure of the body has each through-hole sealed at one end, and sintering the body made of the raw material paste and having the honeycomb structure sealed by the sealant composition such that a ceramic body having the honeycomb structure is formed.

20 Claims, 7 Drawing Sheets

(56) References Cited

U.S. PATENT DOCUMENTS

| | | | |
|---|---|---|---|
| 8,092,568 B2* | 1/2012 | Konomi et al. | 55/523 |
| 2004/0051196 A1* | 3/2004 | Otsuka et al. | 264/41 |
| 2007/0105707 A1* | 5/2007 | Ichikawa | 501/141 |
| 2009/0113863 A1* | 5/2009 | Lu et al. | 55/523 |
| 2009/0214819 A1* | 8/2009 | Tomita | 428/116 |
| 2009/0243166 A1* | 10/2009 | Noguchi et al. | 264/631 |
| 2010/0247406 A1* | 9/2010 | Ohno et al. | 422/222 |
| 2010/0310819 A1* | 12/2010 | Suwabe et al. | 428/116 |
| 2011/0036080 A1* | 2/2011 | Beall et al. | 60/299 |
| 2012/0023879 A1* | 2/2012 | Okazaki | 55/523 |
| 2012/0240538 A1* | 9/2012 | Isoda et al. | 55/486 |
| 2014/0021129 A1* | 1/2014 | Teranishi et al. | 210/500.26 |
| 2014/0127453 A1* | 5/2014 | Toyoshima et al. | 428/116 |
| 2014/0248464 A1* | 9/2014 | Soga | 428/117 |
| 2014/0311112 A1* | 10/2014 | Toyoshima et al. | 55/529 |
| 2014/0370235 A1* | 12/2014 | Takahashi et al. | 428/117 |

OTHER PUBLICATIONS

U.S. Appl. No. 13/872,483, filed Apr. 29, 2013, Yamayose.
U.S. Appl. No. 13/873,576, filed Apr. 30, 2013, Yamayose.
U.S. Appl. No. 13/873,379, filed Apr. 30, 2013, Yamayose.
U.S. Appl. No. 13/887,688, filed May 6, 2013, Yamayose.
U.S. Appl. No. 13/873,763, filed Apr. 30, 2013, Yamayose.
U.S. Appl. No. 13/873,933, filed Apr. 30, 2013, Yamayose.

* cited by examiner

Cross-sectional view at line (A-A)

METHOD FOR MANUFACTURING ALUMINUM-TITANATE-BASED CERAMIC HONEYCOMB STRUCTURE

CROSS-REFERENCE TO RELATED APPLICATIONS

The present application is based upon and claims the benefit of priority from U.S. Application No. 61/787,566, filed Mar. 15, 2013, the entire contents of which are incorporated herein by reference.

BACKGROUND OF THE INVENTION

1. Field of the Invention

The present invention relates to a method for manufacturing an aluminum-titanate-based ceramic honeycomb structural body. More specifically, the present invention relates to a method for manufacturing a sealed body using a sealant made of material whose composition is different from that of the body shaped from the material paste.

2. Description of Background Art

Published Japanese translation 2009-543755 describes plugging mixtures for a ceramic wall-flow filter that contain an aluminum-titanate precursor reactive batch composition containing an alumina source, a silica source and a titania source; a sintering aid; an organic binder; and a liquid vehicle. Also, published Japanese translation 2010-522106 describes plugging mixtures for forming a ceramic wall-flow filter, which show a reduced percentage of volumetric contraction during a drying process, and generally contain an inorganic ceramic powder batch composition; an organic binder; a liquid vehicle; and a non-foaming volume transformation agent. The entire contents of these publications are incorporated herein by reference.

SUMMARY OF THE INVENTION

According to one aspect of the present invention, a method for manufacturing a ceramic honeycomb structure includes kneading titania particles, alumina particles and a binder ingredient such that a raw material paste including the titania particles, the alumina particles and the binder ingredient is prepared, forming a body made of the raw material paste and having a honeycomb structure such that the body has the honeycomb structure having multiple through-holes extending in the longitudinal direction of the body and multiple partitions formed between the through-holes, applying a sealant composition including aluminum hydroxide particles, talc particles, kaolin particles, water and an organic binder to either end of each of the through-holes of the body in the longitudinal direction such that the honeycomb structure of the body has each of the through-holes sealed at one end, and sintering the body made of the raw material paste and having the honeycomb structure sealed by the sealant composition such that a ceramic body having the honeycomb structure is formed.

According to another aspect of the present invention, a method for manufacturing a ceramic honeycomb structure includes kneading titania particles, alumina particles and a binder ingredient such that a raw material paste including the titania particles, the alumina particles and the binder ingredient is prepared, forming a body made of the raw material paste and having a honeycomb structure such that the body has the honeycomb structure having multiple through-holes extending in the longitudinal direction of the body and multiple partitions formed between the through-holes, sintering the body made of the raw material paste and having the honeycomb structure such that a sintered body having the honeycomb structure is formed, applying a cordierite sealant composition including cordierite particles, water and an organic binder to either end of each of the through-holes of the sintered body in the longitudinal direction such that the honeycomb structure of the sintered body has each of the through-holes sealed at one end, and thermally treating the sintered body having the honeycomb structure sealed by the cordierite sealant composition such that a ceramic honeycomb structure having the honeycomb structure is formed.

According to yet another aspect of the present invention, a method for manufacturing a ceramic honeycomb structure includes kneading titania particles, alumina particles and a binder ingredient such that a raw material paste including the titania particles, the alumina particles and the binder ingredient is prepared, forming a body made of the raw material paste and having a honeycomb structure such that the body has the honeycomb structure having multiple through-holes extending in the longitudinal direction of the body and multiple partitions formed between the through-holes, sintering the body made of the raw material paste and having the honeycomb structure such that a sintered body having the honeycomb structure is formed, applying a sealant composition including aluminum hydroxide particles, talc particles, kaolin particles, water and an organic binder to either end of each of the through-holes of the sintered body in the longitudinal direction such that the honeycomb structure of the sintered body has each of the through-holes sealed at one end, and thermally treating the sintered body having the honeycomb structure sealed by the sealant composition such that a ceramic honeycomb structure having the honeycomb structure is formed.

Still another aspect of the present invention is a ceramic honeycomb structural body produced by the method for manufacturing a ceramic honeycomb structure including kneading titania particles, alumina particles and a binder ingredient such that a raw material paste including the titania particles, the alumina particles and the binder ingredient is prepared, forming a body made of the raw material paste and having a honeycomb structure such that the body has the honeycomb structure having multiple through-holes extending in the longitudinal direction of the body and multiple partitions formed between the through-holes, applying a sealant composition including aluminum hydroxide particles, talc particles, kaolin particles, water and an organic binder to either end of each of the through-holes of the body in the longitudinal direction such that the honeycomb structure of the body has each of the through-holes sealed at one end, and sintering the body made of the raw material paste and having the honeycomb structure sealed by the sealant composition such that a ceramic body having the honeycomb structure is formed.

Still another aspect of the present invention is a ceramic honeycomb structural body produced by the method for manufacturing a ceramic honeycomb structure including kneading titania particles, alumina particles and a binder ingredient such that a raw material paste including the titania particles, the alumina particles and the binder ingredient is prepared, forming a body made of the raw material paste and having a honeycomb structure such that the body has the honeycomb structure having multiple through-holes extending in the longitudinal direction of the body and multiple partitions formed between the through-holes, sintering the body made of the raw material paste and having the honeycomb structure such that a sintered body having the honeycomb structure is formed, applying a cordierite sealant composition including cordierite particles, water and an organic binder to either end of each of the through-holes of the sintered body in the longitudinal direction such that the honeycomb structure of the sintered body has each of the through-holes sealed at one end, and thermally treating the sintered body having the honeycomb structure sealed by the cordierite sealant composition such that a ceramic honeycomb structure having the honeycomb structure is formed.

Still another aspect of the present invention is a ceramic honeycomb structural body produced by the method for manufacturing a ceramic honeycomb structure including kneading titania particles, alumina particles and a binder ingredient such that a raw material paste including the titania particles, the alumina particles and the binder ingredient is prepared, forming a body made of the raw material paste and having a honeycomb structure such that the body has the honeycomb structure having multiple through-holes extending in the longitudinal direction of the body and multiple partitions formed between the through-holes, sintering the body made of the raw material paste and having the honeycomb structure such that a sintered body having the honeycomb structure is formed, applying a sealant composition including aluminum hydroxide particles, talc particles, kaolin particles, water and an organic binder to either end of each of the through-holes of the sintered body in the longitudinal direction such that the honeycomb structure of the sintered body has each of the through-holes sealed at one end, and thermally treating the sintered body having the honeycomb structure sealed by the sealant composition such that a ceramic honeycomb structure having the honeycomb structure is formed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
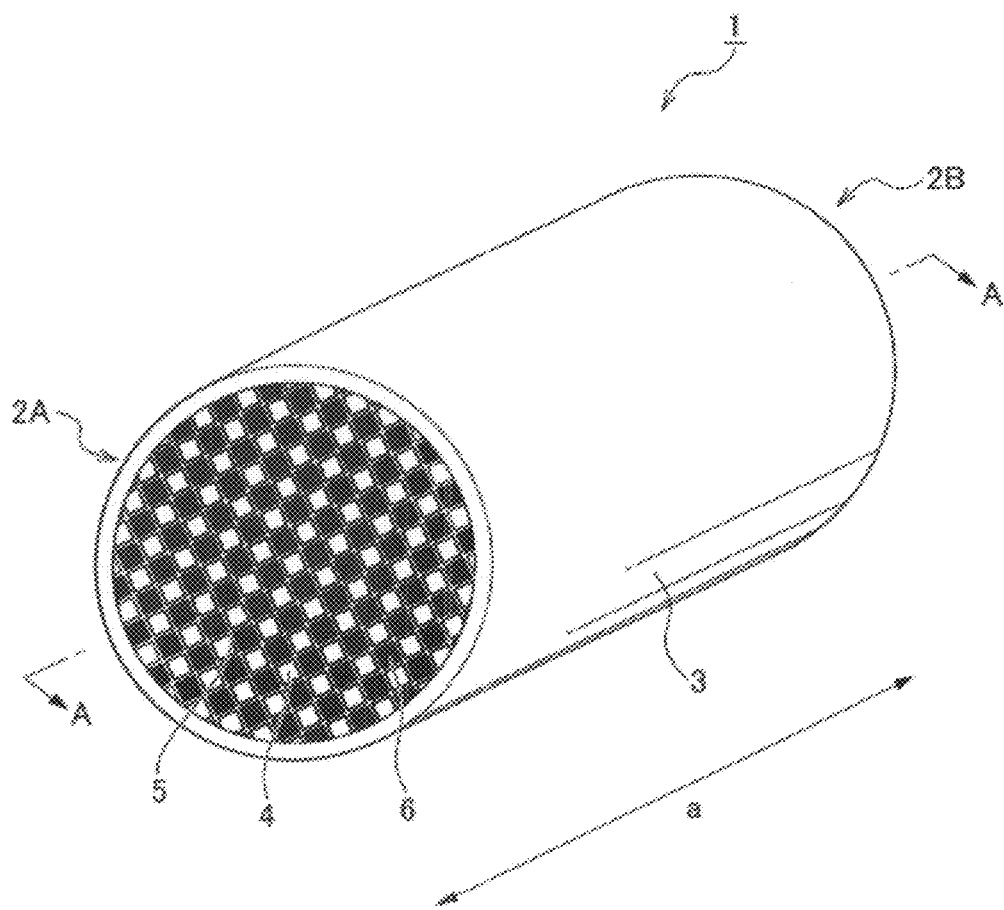
FIG. 1 is a perspective view schematically showing an example of a ceramic honeycomb structural body obtained by a manufacturing method according to an embodiment of the present invention.

The embodiments will now be described with reference to the accompanying drawings, wherein like reference numerals designate corresponding or identical elements throughout the various drawings.

The preferred embodiments will now be described with reference to the accompanying drawings, wherein like reference numerals designate corresponding or identical elements throughout the various drawings.

FIG. 1 is a perspective view schematically showing an example of a ceramic honeycomb structural body obtained by a manufacturing method according to an embodiment of the present invention.

As shown in FIG. 1, a ceramic honeycomb structure according to an embodiment of the present invention is made of aluminum-titanate-based ceramic body 1 (aluminum-titanate-based sintered body), for example. Ceramic body 1 has two open end surfaces (2A, 2B) and side surface 3. Also, ceramic body 1 has multiple cells made of through-holes 4 and partitions 5 which section off through-holes 4. Through-holes 4 extend from end surface (2A) to end surface (2B) along a longitudinal direction of ceramic body 1 (direction along arrow (a) in FIG. 1), and through-holes 4 are sectioned off by partitions 5. In addition, either end of a through-hole 4 in longitudinal direction (a) is sealed by sealant 6, while the other end is left open. Thus, through-hole 4 is sealed by sealant 6 only at either end. As shown in FIG. 1, end surfaces (2A, 2B) of ceramic body 1 are in a checkered pattern where predetermined portions are alternately sealed. However, end surfaces (2A, 2B) of ceramic body 1 are not limited to such a pattern and may be in any other sealing pattern.

The shape of ceramic body 1 may also be an elliptic cylinder, a rectangular prism or a polygonal prism instead of a circular cylinder as shown in FIG. 1.

Figure 2:
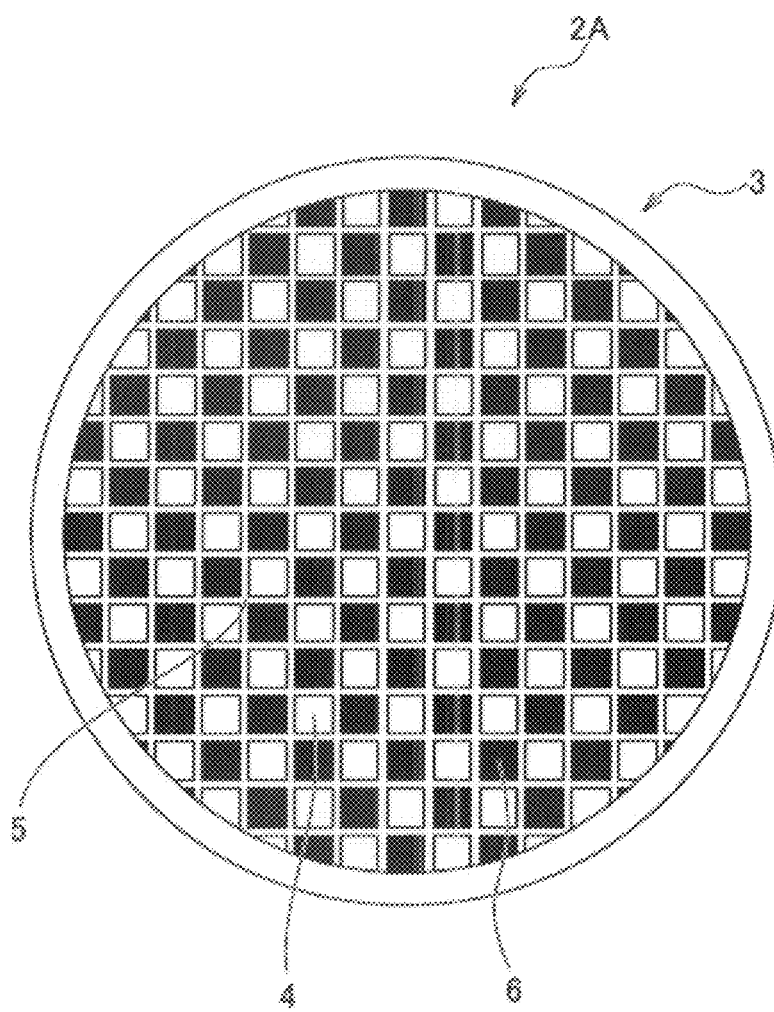
FIG. 2 is a view showing an end surface of the ceramic honeycomb structural body shown in FIG. 1.

FIG. 2 is a view showing an end surface of ceramic honeycomb structural body 1 shown in FIG. 1.

Through-holes 4 are sectioned off by partitions 5 at end surface (2A) of ceramic body 1 as shown in FIG. 2. Also, some end portions of through-holes 4 are sealed by sealant 6 while others are not sealed by sealant 6 and remain open as shown in FIG. 2. Namely, through-hole 4 is sealed by sealant 6 only at either end. Every alternate predetermined portion at end surface (2A) of ceramic body 1 is sealed so as to form a checkered pattern.

Figure 3:
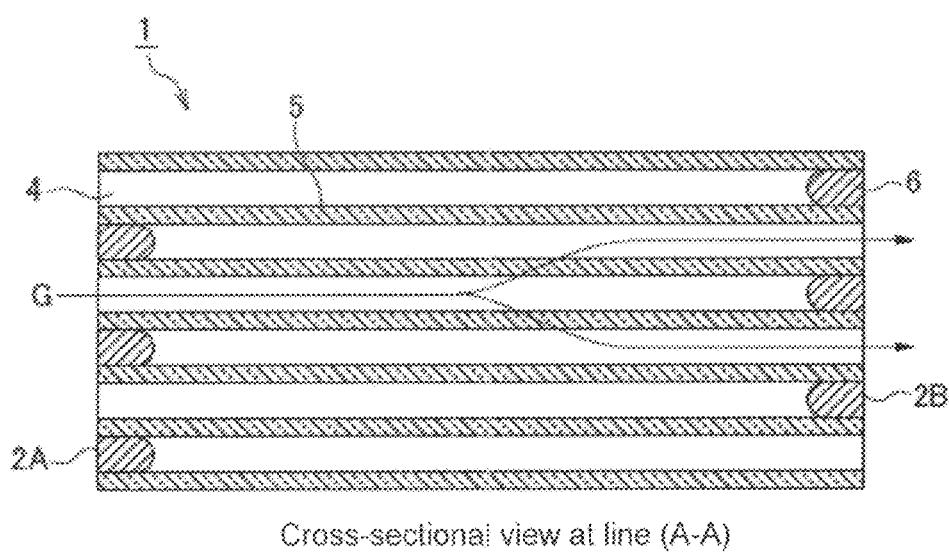
FIG. 3 is a cross-sectional view at line (A-A) of the ceramic honeycomb structural body shown in FIG. 1.

FIG. 3 is a cross-sectional view at line (A-A) of the ceramic honeycomb structural body shown in FIG. 1.

As shown in FIG. 3, one end surface (2A) is positioned on the inflow side, and exhaust gas (G) (exhaust gas from a diesel engine, for example) flows into open through-holes 4, passes through partitions 5 which section off through-holes 4, and flows out from other through-holes 4 that are open at the other end surface (2B) on the outflow side. Therefore, in ceramic honeycomb structural body 1 according to an embodiment of the present invention, partitions 5 can function as a filter to capture particulate matter (PM) or the like, for example, as a diesel particulate filter (DPF).

Next, a method for manufacturing a ceramic honeycomb structure is described in detail according to the embodiments of the present invention.

Figure 4:
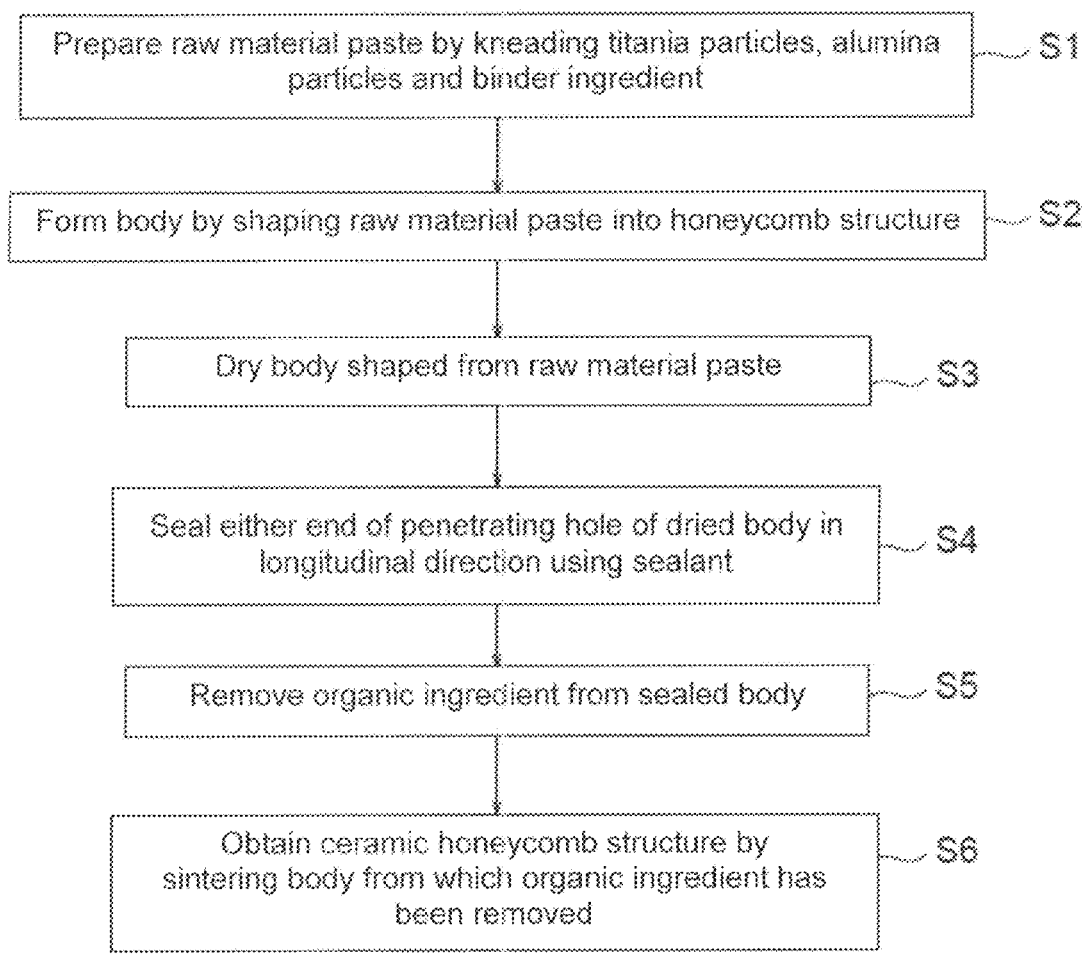
FIG. 4 is a flowchart showing an example of the manufacturing method according to a first embodiment of the present invention.

FIG. 4 is a flowchart showing an example of the method for manufacturing a honeycomb structure according to a first embodiment of the present invention.

As shown in FIG. 4, following is an example of a method for manufacturing a ceramic honeycomb structure: preparation step (S1) for preparing raw material paste by kneading titania particles, alumina particles and a binder ingredient; forming step (S2) to form a body by shaping the raw material paste into a honeycomb structure; drying step (S3) for drying a body shaped from the raw material paste; sealing step (S4) for sealing either end of a through-hole of a dried body in a longitudinal direction using a sealant composition containing aluminum hydroxide particles, talc particles, kaolin particles, water and an organic binder; degreasing step (S5) for removing organic ingredients from a sealed body; and sintering step (S6) to obtain a ceramic honeycomb structure by sintering the body from which organic ingredients are removed.

However, it is an option not to conduct drying step (S3) and degreasing step (S5) in a first embodiment of a method for manufacturing a ceramic honeycomb structure. Namely, when manufacturing a ceramic honeycomb structure according to the first embodiment, it is an option to conduct preparation step (S1) for preparing raw material paste by kneading titania particles, alumina particles and a binder ingredient; forming step (S2) to form a body by shaping the raw material paste into a honeycomb structure; and sealing step (S4) for sealing either end of a through-hole of a body shaped from the raw material paste in a longitudinal direction using a sealant composition containing aluminum hydroxide particles, talc particles, kaolin particles, water and an organic binder, and then directly afterward, to conduct sintering step (S6) to obtain a ceramic honeycomb structure by sintering the body.

Each step is described below.

Preparation of Raw Material Paste (S1)

In a preparation step, raw material paste is prepared by kneading titania particles, alumina particles and a binder ingredient. Also, raw material paste may be prepared by kneading titania particles, alumina particles, mullite particles and a binder ingredient.

In the present application, titania particles indicate those containing only titania, and alumina particles indicate those containing only alumina. Mullite particles mean particles formed with alumina components and silicon dioxide components. Here, titania particles, alumina particles and mullite particles may also contain impurities. As for impurities, for example, silicon (Si), aluminum (Al), iron (Fe), calcium (Ca), magnesium (Mg), potassium (K), sodium (Na) and the like are listed.

A method for kneading particles and a binder ingredient is not limited specifically, and a mixer, a kneader, a media mixing mill (attritor), a pressure kneader (muller) or the like may be used for kneading.

Titania particles and alumina particles may be used as is, or they may be slurried using a dispersion medium such as water. Alternatively, mixed particles of titania particles and alumina particles may also be used as described later. In addition, mullite particles may be added to titania particles and alumina particles.

As for titania particles and alumina particles used in the preparation step, it is an option to use a precursor in which titania particles and alumina particles are combined at an amount-of-substance ratio of titania to alumina in a range of 40:60~60:40, for example. It is also preferable to combine titania particles and alumina particles in a precursor at an amount-of-substance ratio of titania to alumina in a range of 45:55~55:45, for example. An amount-of-substance ratio here means a ratio of the amount of substance of titania to the amount of substance of alumina, not an amount-of-substance ratio of titania particles to alumina particles. Therefore, when mullite particles or the like are used when forming a precursor, an amount-of-substance ratio of titania to alumina is obtained based on the sum of alumina (amount of substance of alumina) derived from alumina particles and alumina derived from mullite particles. Accordingly, when mullite particles are used in the preparation step, it is preferred to combine mullite particles with titania particles and alumina particles in an amount-of-substance ratio of titania to alumina that is within the above range.

When titania particles and alumina particles are combined in a preparation step or a preconditioning treatment step, their weight ratio is, for example, in a range of 35:65~55:45, preferably, 40:60~50:50. The amount of unreacted titania or alumina remaining after sintering is reduced if combined within such a ratio.

Particle diameters of titania particles and alumina particles are not limited specifically. For example, when particle diameters of titania particles and alumina particles are compared, it is an option to employ any of the following: the diameter of titania particles is greater than that of alumina particles; the diameter of titania particles is smaller than that of alumina particles; or the diameter of titania particles is substantially the same as that of alumina particles.

When alumina particles and titania particles having a particle diameter greater than that of alumina particles are used, it may be referred to as a "first mode" in the following. In addition, when alumina particles and titania particles having a particle diameter smaller than that of alumina particles are used, it is referred to as a "second mode" and described below. Moreover, when alumina particles and titania particles having a particle diameter substantially the same as each other are used, it is referred to as a "third mode" and described below.

As for the particle diameter of titania particles in the first mode, the mean volume particle diameter is 5 μm~20 μm, for example. Also, particles with a mean volume particle diameter of 8 μm~18 μm or the like may be used. Here, it is an option to use primary particles of titania particles, secondary particles that are aggregate primary particles, or a combination thereof.

In the present application, mean volume particle diameters are measured using a laser diffraction particle size distribution analyzer (Beckman Coulter Inc.).

As for the particle diameter of alumina particles in the first mode, the mean volume particle diameter is 2 μm~5 μm, for example.

In the present application, the type of alumina particles to be used is not limited specifically. For example, α-alumina particles, γ-alumina particles, a combination of α-alumina particles and γ-alumina particles, or the like may be used. In addition, alumina particles may be primary particles, secondary particles that are aggregate primary particles, or a combination thereof.

In the first mode, the ratio of particle diameters of titania particles to alumina particles is not limited specifically, and it may be in a range of 10:1~10:3, for example.

A second mode is described in the following, using alumina particles and titania particles having a smaller particle diameter than alumina particles.

As for the particle diameter of titania particles in the second mode, the mean volume particle diameter is 0.1 μm~0.8 μm or 0.2 μm~0.5 μm, for example.

As for the particle diameter of alumina particles in the second mode, the mean volume particle diameter is 2 μm~5 μm, for example.

In the second mode, the ratio of particle diameters of titania particles to alumina particles is not limited specifically, and it may be in a range of 1:4~1:10, for example.

Furthermore, a third mode is described, using titania particles and alumina particles having substantially the same particle diameters as each other.

As for the particle diameter of titania particles in the third mode, the mean volume particle diameter is 1 μm~5 μm or 1 μm~3 μm, for example.

As for the particle diameter of alumina particles in the third mode, the mean volume particle diameter is 2 μm~5 μm, for example.

In the third mode, the ratio of particle diameters of titania particles to alumina particles is not limited specifically, and it may be in a range of 1.0:0.3~1:4, for example.

As for the particle diameter of mullite particles to be used in addition to titania particles and alumina particles when needed, the mean volume particle diameter is 0.1 μm~45 μm, for example. Alternatively, a mean volume particle diameter of 0.1 μm~20 μm, 0.5 μm~10 μm and so forth, for example, may also be used. When a body is sintered and aluminum titanate is produced, unreacted aluminum and silicon contained in mullite particles are thought to melt and work as a binder that fills spaces in aluminum titanate.

The mullite particles may be primary particles, secondary particles that are aggregate primary particles, or a combination thereof.

The powder of titania particles (titania powder) containing titania particles used for forming a precursor in the present embodiment, may include impurities such as silicon (Si), aluminum (Al), iron (Fe), calcium (Ca), magnesium (Mg), potassium (K) and sodium (Na). In the present application, "titania particle powder" means bulk (material, raw material) of titania particles to be used in a method for manufacturing a ceramic honeycomb structure. Here, impurities in titania powder may be such that are contained inevitably during a process for manufacturing titania, or may be such that are mixed into titania powder separately. In addition to impurities that make solid solutions with titania particles, other impurities that are present outside titania particles of titania powder may also be included.

It is thought that those impurities contribute to suppressing the decomposition of aluminum titanate, which is made from titania particles and alumina particles, into titania and alumina in a high temperature range, or to improving the mechanical strength of aluminum titanate.

The amount of impurities is adjusted by controlling the amount of impurities contained in raw titania material such as $Ti(OH)_4$ (titania powder) or the like or by cleansing synthesized titania by using acids, alkalis or the like.

The amount of iron in titania powder is preferred to be at a weight ratio of 200 ppm~1000 ppm in the titania powder in terms of $Fe_2O_3$. When the amount of iron in titania powder is in the above range, it is thought that aluminum titanate formed when part of $Al^{3+}$ is displaced by $Fe^{2+}$ is suppressed from decomposing into titania and alumina in a high temperature range.

The amount of silicon contained in titania powder is preferred to be 0.1 wt.%~1.0 wt.% of the titania powder in terms of $SiO_2$. When the amount of silicon in titania powder is in the above range, it is thought that aluminum titanate formed when part of $Al^{3+}$ is displaced by $Si^{4+}$ is suppressed from decomposing into titania and alumina in a high temperature range.

Magnesium is preferred not to be contained in titania powder. When contained, the amount of magnesium in titania powder is preferred to be at a weight ratio of 500 ppm or lower in the titania powder in terms of MgO. Since MgO tends to absorb water, if MgO exists at particle boundaries among aluminum titanate particles, it is thought that MgO may cause cracking due to expansion from moisture absorption. Thus, the amount of magnesium in titania powder is preferred to be within the above range. Alternatively, it is preferred that no magnesium, or substantially no magnesium (at or below the detection limit), be contained in titania powder.

The amount of potassium in titania powder is preferred to be at a weight ratio of 100 ppm~600 ppm in the titania powder in terms of $K_2O$. In addition, the amount of sodium in titania powder is preferred to be at a weight ratio of 200 ppm~1000 ppm in the titania powder in terms of $Na_2O$. It is thought that $K_2O$ and $Na_2O$ work as sintering aids for sinter bonding aluminum titanate particles to each other so as to suppress cracking at particle boundaries among aluminum titanate particles. Thus, the amounts of potassium and sodium in titania powder are preferred to be in the above ranges.

Specifically, mixed particles of titania particles and alumina particles, or mixed particles of titania particles, alumina particles and mullite particles are formed by the following preconditioning treatment step.

Preconditioning Treatment

Titania particles and alumina particles are brought into contact and adhered to each other to form a precursor (a particle contact body of titania particles and alumina particles) in a preconditioning treatment step. Accordingly, a precursor is obtained where titania particles and alumina particles are in contact with each other in a homogeneously dispersed state.

In a preconditioning treatment step, a precursor may also be formed by further adding a sintering aid and bringing it into contact with titania particles and alumina particles (particle contact body of titania particles, alumina particles and a sintering aid). As for sintering aids, mullite, zircornia, alkali feldspar, strontium feldspar and the like are listed.

In the present application, "homogenized" indicates that titania particles and alumina particles are present evenly based on the amounts of substance (at a molar ratio). It is more preferred that an amount-of-substance ratio of titania to alumina in a precursor be in a range of 40:60~60:40, for example. As described above, an amount-of-substance ratio here means a ratio of the amount of substance of titania to the amount of substance of alumina, not an amount-of-substance ratio of titania particles to alumina particles. Therefore, when mullite particles or the like are used when forming a precursor, an amount-of-substance ratio of titania to alumina is obtained based on the sum (amount of substance of alumina) of alumina derived from alumina particles and alumina derived from mullite particles.

In the above first mode, to bring titania particles and alumina particles into contact with each other, the following may be employed, for example: a method in which a mixture containing titania particles and alumina particles is spray-dried; a method in which titania particles and alumina particles are granulated through a rolling motion; a method in which an aqueous dispersion of alumina particles is formed by dispersing alumina particles in a dispersion medium such as water, and then titania particles are immersed in the aqueous dispersion of alumina particles; or a method in which a mixture of titania particles and alumina particles is slurried and then dried while being mixed.

As for a method in which a mixture containing titania particles and alumina particles is spray-dried, for example, a mixture containing titania particles and alumina particles is slurried and spray-dried so that titania particles and alumina particles are homogenized.

In addition, as for another method of spray drying, for example, a binder ingredient to be used in a later-described preparation step is further added to the mixture containing titania particles and alumina particles at 5%~10% by mass based on the entire mass of titania particles, and then the mixture is spray-dried.

As for a method in which titania particles and alumina particles are granulated through a rolling motion, for example, titania particles, alumina particles and water are placed into an oscillating granulator and then put into a rolling motion to prepare a precursor; titania particles and water are placed into an oscillating granulator and put into a rolling motion, then alumina particles are added to the oscillating granulator and put into a rolling motion so that a precursor is prepared; and so forth. In such cases, a ratio of 5%~10% by mass of water based on the entire mass of titania particles is used. Moreover, it is an option to use a binder ingredient (such as methylcellulose) along with water. A ratio of 5%~10% by mass of a binder ingredient based on the entire mass of titania particles may be used.

As for a method in which titania particles are immersed in an aqueous dispersion of alumina particles, for example, alumina particles are dispersed in a dispersion medium such as water to form an aqueous dispersion of alumina particles, titania particles are immersed in the aqueous dispersion of alumina particles, and then a precursor, in which titania particles and alumina particles are homogeneously in contact with each other, is lifted from the aqueous dispersion of alumina particles.

As for a method in which a mixture containing titania particles and alumina particles is slurried and then dried while being mixed, for example, titania particles and alumina particles are slurried using a volatile solvent or the like to form a homogeneous mixture, which is then dried while being mixed.

In the first mode, by conducting a preconditioning treatment step, it is easier to form a precursor where multiple alumina particles make contact with the surface of a titania particle using alumina particles and titania particles whose particle diameter is greater than that of alumina particles.

In addition, to bring titania particles and alumina particles into contact with each other in the second mode above, the following may be employed, for example: a method in which a mixture containing titania particles and alumina particles is spray-dried; a method in which titania particles and alumina particles are granulated through a rolling motion; a method in which an aqueous dispersion of titania particles is formed by dispersing titania particles in a dispersion medium such as water and then alumina particles are immersed in the aqueous dispersion of titania particles; or a method in which a mixture of titania particles and alumina particles is slurried, and is dried while being mixed. As for a method for granulating titania particles and alumina particles through a rolling motion, a precursor may also be prepared when alumina particles and water are placed into an oscillating granulator, put into a rolling motion, and then titania particles are added into the oscillating granulator and put into a rolling motion.

In the second mode, by conducting preconditioning treatment step, it is easier to form a precursor where titania particles make contact with the surface of an alumina particle.

In the third mode, to bring titania particles and alumina particles into contact with each other, the following may be employed, for example: a method in which a mixture containing titania particles and alumina particles is spray-dried; a method in which titania particles and alumina particles are granulated through a rolling motion; a method in which an aqueous dispersion of alumina particles is formed by dispersing alumina particles in a dispersion medium such as water and then titania particles are immersed in the aqueous dispersion of alumina particles; a method in which an aqueous dispersion of titania particles is formed by dispersing titania particles in a dispersion medium such as water and then alumina particles are immersed in the aqueous dispersion of titania particles; or a method in which a mixture of titania particles and alumina particles is slurried, and is dried while being mixed.

In the third mode, when a preconditioning treatment step is conducted using titania particles and alumina particles having substantially the same particle diameter as each other, it is easier to form a mixture of a precursor where multiple alumina particles are in contact with the surface of a titania particle, a precursor where multiple titania particles are in contact with the surface of an alumina particle, and the like.

In a preconditioning treatment step, the precursor is not sintered directly after the preconditioning treatment step. It is thought to be easier to form a precursor with a uniform particle diameter and to knead the precursor and a binder ingredient for a short duration.

By doing such a preconditioning treatment step, titania particles and alumina particles are more likely to come in contact with each other. Accordingly, precursor 7 is formed, where alumina particles 9 make contact with titania particle 8 to cover its surface, for example (FIG. 7).

Figure 7:
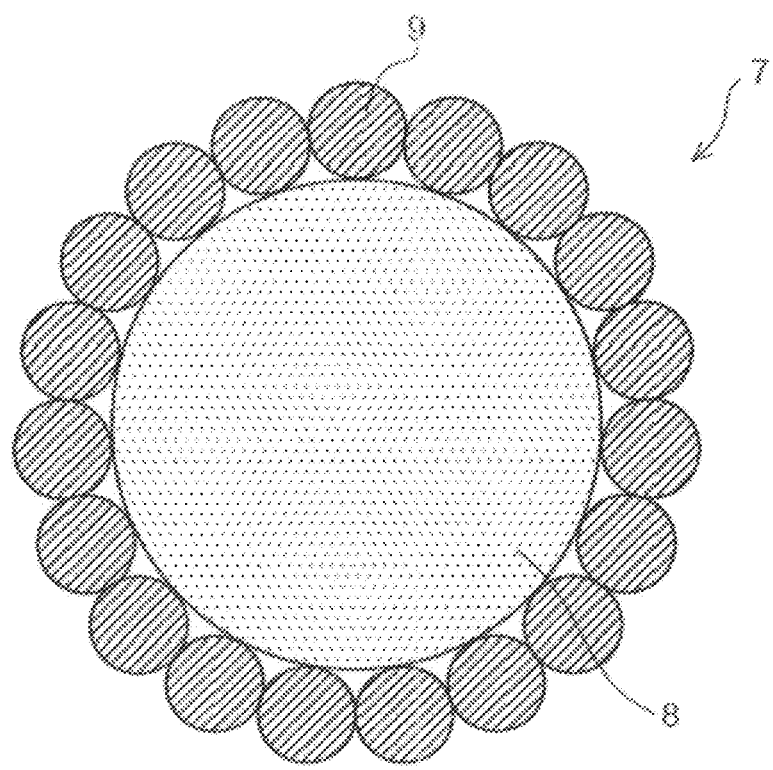
FIG. 7 is a view schematically showing an example of a titania particle and alumina particles.

FIG. 7 shows a state where titania particle 8 is covered with alumina particles 9. That is an example of a precursor. Here, the state of a precursor is not limited to such a size relationship between titania particles and alumina particles as shown in FIG. 7, and another state, where the size of alumina particles is greater than that of titania particles and the surface of an alumina particle is covered with titania particles, may be employed. In addition, yet another state, where the size of titania particles is substantially the same as that of alumina particles, may also be employed.

Also, when an aggregate of primary particles is used for titania particles, titania particles and alumina particles are more likely to come in contact with each other by performing a preconditioning treatment step as described above. For example, as shown in FIG. 7, a precursor (7A) is formed, where titania particles (secondary particles) (8B) that are aggregate titania particles (primary particles) (8A) are covered with alumina particles 9.

In the present application, a "precursor" means a granular substance where titania particles and alumina particles make contact and adhere to each other.

When titania particles, alumina particles and mullite particles make contact and adhere to each other, a precursor (a particle contact body of titania particles, alumina particles and mullite particles) is formed by the same method described above for bringing titania particles and alumina particles into contact with each other.

To bring titania particles, alumina particles and mullite particles into contact with each other, the following may be employed, for example: a method in which a mixture containing titania particles, alumina particles and mullite particles is spray-dried; a method in which titania particles, alumina particles and mullite particles are granulated through a rolling motion; a method in which a mixed aqueous dispersion of alumina particles and mullite particles is formed by dispersing alumina particles and mullite particles in a dispersion medium such as water, and then titania particles are immersed in the mixed aqueous dispersion; or a method in which a mixture of titania particles, alumina particles and mullite particles is slurried and then dried while being mixed.

As for a binder ingredient, the following are listed: celluloses such as methylcellulose, carboxymethyl cellulose and sodium carboxymethyl cellulose; alcohols such as polyvinyl alcohol; salts such as lignosulfonate; waxes such as paraffin wax and microcrystalline wax; and thermoplastic resins such as EVA, polyethylene, polystyrene, liquid-crystal polymer and engineering plastics.

The amount of a binder ingredient to be added is 0.1%~20% by mass based on 100% by mass of a precursor, for example. It may be 1%~15% by mass, for example.

To prepare raw material paste, other ingredients may be added to a precursor and a binder ingredient.

As for other ingredients, pore-forming agents, lubricants, plasticizers, dispersing agents, solvents and the like are listed.

For pore-forming agents, the following are listed: carbon materials such as graphite; resins such as polyethylene, polypropylene and polymethylmethacrylate;

plant-based materials such as starch, nut shells, walnut shells and corn; ice; dry ice; and the like.

The amount of a pore-forming agent to be added is 0.1%~30% by mass based on 100% by mass of a precursor. It may be 1%~20% by mass, for example.

For lubricants and plasticizers, the following are listed, for example: alcohols such as glycerin; higher fatty acids such as caprylic acid, lauric acid, palmitic acid, alginic acid, oleic acid and stearic acid; and metal stearate such as aluminum stearate.

The amount of a lubricant or plasticizer to be added is 0.01%~5% by mass based on 100% by mass of a precursor. It may be 0.1%~1% by mass.

As for dispersing agents, the following are listed, for example: inorganic acids such as nitric acid, hydrochloric acid and sulfuric acid; organic acids such as oxalic acid, citric acid, acetic acid, malic acid and lactic acid; alcohols such as methanol, ethanol and propanol; surfactants such as ammonium polycarboxylate and polyoxyalkylene alkyl ether; and so forth.

The amount of a dispersing agent to be added is 0.01%~10% by mass based on 100% by mass of a precursor. It may be 0.05%~2% by mass.

As for solvents, the following are listed, for example: alcohols such as methanol, ethanol, butanol and propanol; glycols such as propylene glycol, polypropylene glycol and ethylene glycol; water; and the like.

The amount of a solvent to be added is 0.1%~50% by mass. It may be 10%~40% by mass.

Forming of Honeycomb Structural Body (S2)

In a forming step, a body is formed by shaping the raw material paste into a honeycomb structure.

Forming raw material paste into a shape is not limited to any specific method, and extrusion through a honeycomb die, injection, pressing or the like may be employed.

Drying of Body Shaped from Raw Material Paste (S3)

In a drying step, the body shaped from the raw material paste is dried.

Dryers for a drying step are not limited to any specific type, and the following are listed: microwave dryers, hot-air dryers, dielectric heating dryers, reduced-pressure dryers, vacuum dryers, freeze dryers and the like.

The duration and temperature required for drying are set appropriately according to the volume or the like of a honeycomb body shaped from the raw material paste.

Sealing of Through-Holes (S4)

In a sealing step, either end of a through-hole of a dried body in a longitudinal direction is sealed using a sealant composition containing aluminum hydroxide particles, talc particles, kaolin particles, water and an organic binder to obtain a sealed body.

Application of a sealant to a dried body is not limited specifically. For example, an end surface of a dried body may be immersed into a sealant composition (sealant slurry), or a sealant may be injected into a through-hole from an end surface of a dried body using an injector.

As for a sealant, it is sufficient if it contains aluminum hydroxide particles, talc particles, kaolin particles, water and an organic binder. Moreover, it may also contain magnesium hydroxide particles and magnesium carbonate particles.

When combining a sealant composition, the ratio of aluminum hydroxide particles, talc particles and kaolin particles is not limited specifically. However, it is preferred that the amount-of-substance ratio of magnesium oxide to alumina and to silica in a sealant after sintering be approximately 2:2:5. The same applies when magnesium hydroxide particles and magnesium carbonate particles are contained.

The weight ratio of aluminum hydroxide particles, talc particles and kaolin particles in a sealant composition is preferred to be as follows: aluminum hydroxide particles/talc particles=0.2~0.3; talc particles/kaolin particles=1.0~1.5; and aluminum hydroxide particles/kaolin particles=0.25~0.36. The weight ratio may also be aluminum hydroxide particles/talc particles=0.21~0.27; talc particles/kaolin particles=1.1~1.4; and aluminum hydroxide particles/kaolin particles=0.27~0.34.

Regarding the elements contained in a sealant after sintering, an element analysis is performed using a scanning electron microscope (S-4800, Hitachi, Ltd.) and an energy dispersive X-ray spectrometer (EMAX Energy EX-250, Horiba, Ltd.).

Aluminum hydroxide particles, talc particles and kaolin particles along with magnesium hydroxide particles and magnesium carbonate particles are combined to form a sealant composition. Alternatively, mixed particles (sealant precursor) may also be prepared, using aluminum hydroxide particles, talc particles and kaolin particles along with magnesium hydroxide particles and magnesium carbonate particles.

A sealant precursor is formed by combining aluminum hydroxide particles, talc particles and kaolin particles. Specifically, a sealant precursor is formed, for example, by a method in which a mixture of aluminum hydroxide particles, talc particles and kaolin particles is spray-dried. When a sealant precursor is used, the ratio of combining aluminum hydroxide particles, talc particles and kaolin particles is not limited specifically, either. For example, the amount-of-substance ratio of magnesium oxide to alumina and to silica in sealant after a sintering step is preferred to be in an approximate range of 2:2:5 when combining those particles. The same applies when magnesium hydroxide particles and magnesium carbonate particles are also contained.

The weight ratio of aluminum hydroxide particles, talc particles and kaolin particles in a sealant precursor is preferred to be as follows: aluminum hydroxide particles/talc particles=0.2~0.3; talc particles/kaolin particles=1.0~1.5; and aluminum hydroxide particles/kaolin particles=0.25~0.36. The weight ratio may also be aluminum hydroxide particles/talc particles=0.21~0.27; talc particles/kaolin particles=1.1~1.4; and aluminum hydroxide particles/kaolin particles=0.27~0.34.

The amount of a binder ingredient to be added in a sealant composition is, for example, 1%~30% by mass, 5%~20% by mass or the like based on the entire mass of the sealant composition.

The amount of water to be added in a sealant composition is, for example, 5%~50% by mass, 10%~30% by mass or the like based on the entire mass of the sealant composition. The water in a sealant composition includes water contained in solvents and inorganic binders.

Organic binders or the like to be used for a sealant composition may be the same as those used in forming raw material paste, except for the above conditions. Also, a sealant composition may contain ingredients other than aluminum hydroxide particles, talc particles, kaolin particles, magnesium hydroxide particles, magnesium carbonate particles, a binder ingredient and water. As for such other ingredients, titania particles, alumina particles, mullite particles, pore-forming agents, lubricants, plasticizers, surfactants, dispersing agents, solvents, inorganic binders and the like are listed.

Degreasing of Honeycomb Structural Body (S5)

In a degreasing step, organic ingredients are removed from a sealed body.

Conditions for removing organic ingredients from a sealed body are not limited specifically, and may be selected appropriately according to the type and amount of organic ingredients contained in the honeycomb body. For example, degreasing is conducted at 150° C.~800° C. for two hours, etc.

Sintering of Honeycomb Structural Body (S6)

In a sintering step, a ceramic honeycomb structure is obtained by sintering a body from which organic ingredients have been removed.

Sintering is not limited to any specific method, and is conducted using a sintering furnace such as an electric tube furnace, electric box furnace, tunnel kiln, far infrared furnace, microwave heater, shaft kiln, reverberatory furnace, rotary-hearth furnace or roller-hearth furnace.

As for sintering methods, bodies may be sintered batch by batch or continuously. Alternatively, a body may be settled or circulated while being sintered.

The sintering temperature is 1300° C. or higher, for example, and it may be set at 1350° C. or higher. In addition, the sintering temperature is 1450° C. or lower, for example, and it may be set at 1400° C. or lower. The temperature is set at such a range since particles in a sealant composition start forming cordierite at approximately 1200° C., but such cordierite particles start incongruent melting reactions at approximately 1450° C.

The programmed rate to reach the sintering temperature is not limited specifically, and it may be set at 1° C./hour~500° C./hour.

Sintering a honeycomb body is conducted under oxygen atmosphere such as atmospheric air, for example.

The duration for sintering a honeycomb body differs depending on the amount of raw material paste, the type of sintering furnace, the sintering temperature, the sintering atmosphere and the like. It may be set for 10 minutes~24 hours, for example.

Figure 5:
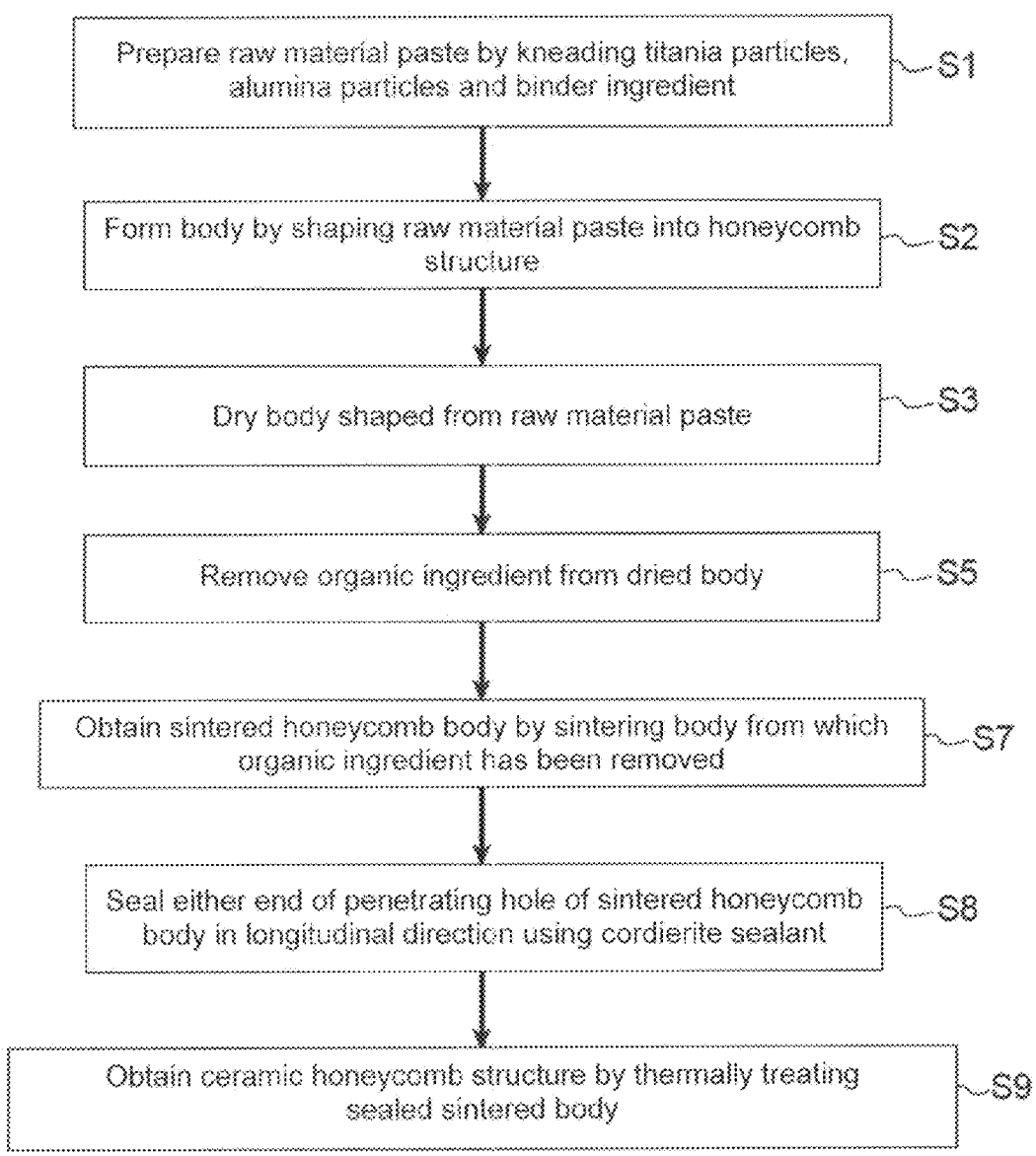
FIG. 5 is a flowchart showing an example of the manufacturing method according to a second embodiment of the present invention.

FIG. 5 is a flowchart showing an example of the method for manufacturing a honeycomb structure according to a second embodiment of the present invention.

As shown in FIG. 5, following is an example of the method for manufacturing a ceramic honeycomb structure: preparation step (S1) for preparing raw material paste by kneading titania particles, alumina particles and a binder ingredient; forming step (S2) to form a body by shaping the raw material paste into a honeycomb structure; drying step (S3) for drying a body shaped from the raw material paste; degreasing step (S5) for removing organic ingredients from a dried body; sintering step (S7) to form a sintered honeycomb body by sintering a body from which organic ingredients have been removed; sealing step (S8) for sealing either end of a through-hole of a sintered honeycomb body in a longitudinal direction using a cordierite sealant composition containing cordierite particles, water and an organic binder; and thermal treatment step (S9) to obtain a ceramic honeycomb structure by thermally treating a sealed sintered body.

However, it is an option not to conduct drying step (S3) and degreasing step (S5) in the method for manufacturing a ceramic honeycomb structure according to the second embodiment.

Sintering step (S7), sealing step (S8) and thermal treatment step (S9) are each described below. As for preparation step (S1), preconditioning treatment step, forming step (S2), drying step (S3) and degreasing step (S5), their respective descriptions provided above apply in the same manner.

Sintering of Honeycomb Structural Body (S7)

In a sintering step (hereinafter also referred to as a final sintering step), a ceramic honeycomb structure is obtained by sintering a body from which organic ingredients have been removed.

Sintering is not limited to any specific method, and is conducted using a sintering furnace such as an electric tube furnace, electric box furnace, tunnel kiln, far infrared furnace, microwave heater, shaft kiln, reverberatory furnace, rotary-hearth furnace or roller-hearth furnace.

As for sintering, a body may be sintered batch by batch or continuously. Alternatively, a body may be settled or circulated while being sintered.

The sintering temperature is 1300° C. or higher, for example, and it may be set at 1350° C. or higher. In addition, the sintering temperature is 1600° C. or lower, for example, and it may be set at 1550° C. or lower.

Since a sealant composition is not applied to through-holes in a final sintering step of the second embodiment, the body is sintered at a higher temperature than in sintering step (S6) of the first embodiment.

The programmed rate to reach the sintering temperature is not limited specifically, and it may be set at 1° C./hour~500° C./hour.

Sintering a honeycomb body is conducted under oxygen atmosphere such as atmospheric air, for example.

The duration for sintering a honeycomb body differs depending on the amount of raw material paste, the type of sintering furnace, the sintering temperature, the sintering atmosphere and the like, and it may be set at 10 minutes to 24 hours, for example.

Sealing of Through-Holes of Sintered Body (S8)

In a sealing step of the second embodiment (hereinafter also referred to as "sealing step for sintering a body using a cordierite sealant composition"), either end of a through-hole of a sintered honeycomb body in a longitudinal direction is sealed by a cordierite sealant composition to form a sealed sintered honeycomb body.

In the sealing step for sintering a body using a cordierite sealant composition, applying the sealant to a honeycomb body is not limited to any specific method. There are methods such as immersing an end surface of a body into sealant slurry, injecting a sealant into a through-hole from an end surface using an injector, and the like.

A cordierite sealant composition contains cordierite particles, water and an organic binder.

As for cordierite particles, for example, they may be formed by crushing a sintered cordierite body into sintered cordierite particles with a mean volume particle diameter of 0.5 µm~5 µm. The type of sintered cordierite body or the method for crushing a sintered cordierite body is not limited specifically.

The mean volume particle diameter of cordierite particles is, for example, 0.8 µm~3.5 µm, 1 µm~3 µm or the like.

The amount of cordierite particles contained in a cordierite sealant composition is, for example, 40%~80% by mass, 45%~75% by mass, 50%~70% by mass or the like based on the entire mass of the cordierite sealant composition.

The amount of organic binder ingredient to be added to a cordierite sealant composition is, for example, 1%~30% by mass, 5%~20% by mass or the like based on the entire mass of the cordierite sealant composition.

The amount of water to be added to a cordierite sealant composition is, for example, 5%~50% by mass, 10%~30% by mass or the like based on the entire mass of the cordierite sealant composition. The water in the cordierite sealant composition includes water in solvents and inorganic binders.

Organic binders or the like to be used for a cordierite sealant composition may be the same as those described in forming raw material paste, except for the above conditions. Also, a cordierite sealant composition may contain ingredients other than cordierite particles, organic binder ingredient and water. As for such other ingredients, titania particles, alumina particles, mullite particles, talc particles, kaolin particles, aluminum hydroxide particles, magnesium hydroxide particles, magnesium carbonate particles, pore-forming agents, lubricants, plasticizers, surfactants, dispersing agents, solvents, inorganic binders and the like are listed.

Thermal Treatment of Sintered Honeycomb Body (S9)

In a thermal treatment step in the second embodiment, a ceramic honeycomb structure is obtained by thermally treating a sintered honeycomb body which is sealed with a cordierite sealant composition.

A thermal treatment is not limited to any specific method, and is conducted using a sintering furnace such as an electric tube furnace, electric box furnace, tunnel kiln, far infrared furnace, microwave heater, shaft kiln, reverberatory furnace, rotary-hearth furnace or roller-hearth furnace.

The thermal treatment temperature may be lower than when a sealant composition is made from the same material as that for raw material paste of a body. For example, it is set at 1300° C. or higher, for example, or it may also be set at 1350° C. or higher. Alternatively, it is set at 1450° C. or lower, for example, or it may also be set at 1400° C. or lower. By so setting, the cordierite sealant composition softens to be adhered to the sintered body.

Thermal treatment of a sintered honeycomb body is conducted under oxygen atmosphere such as atmospheric air, for example.

The duration for thermally treating a sintered honeycomb body differs depending on the amount of sealant composition, the type of sintering furnace, the temperature and atmosphere of thermal treatment and the like. It may be set for 10 minutes~2 hours, for example.

Figure 6:
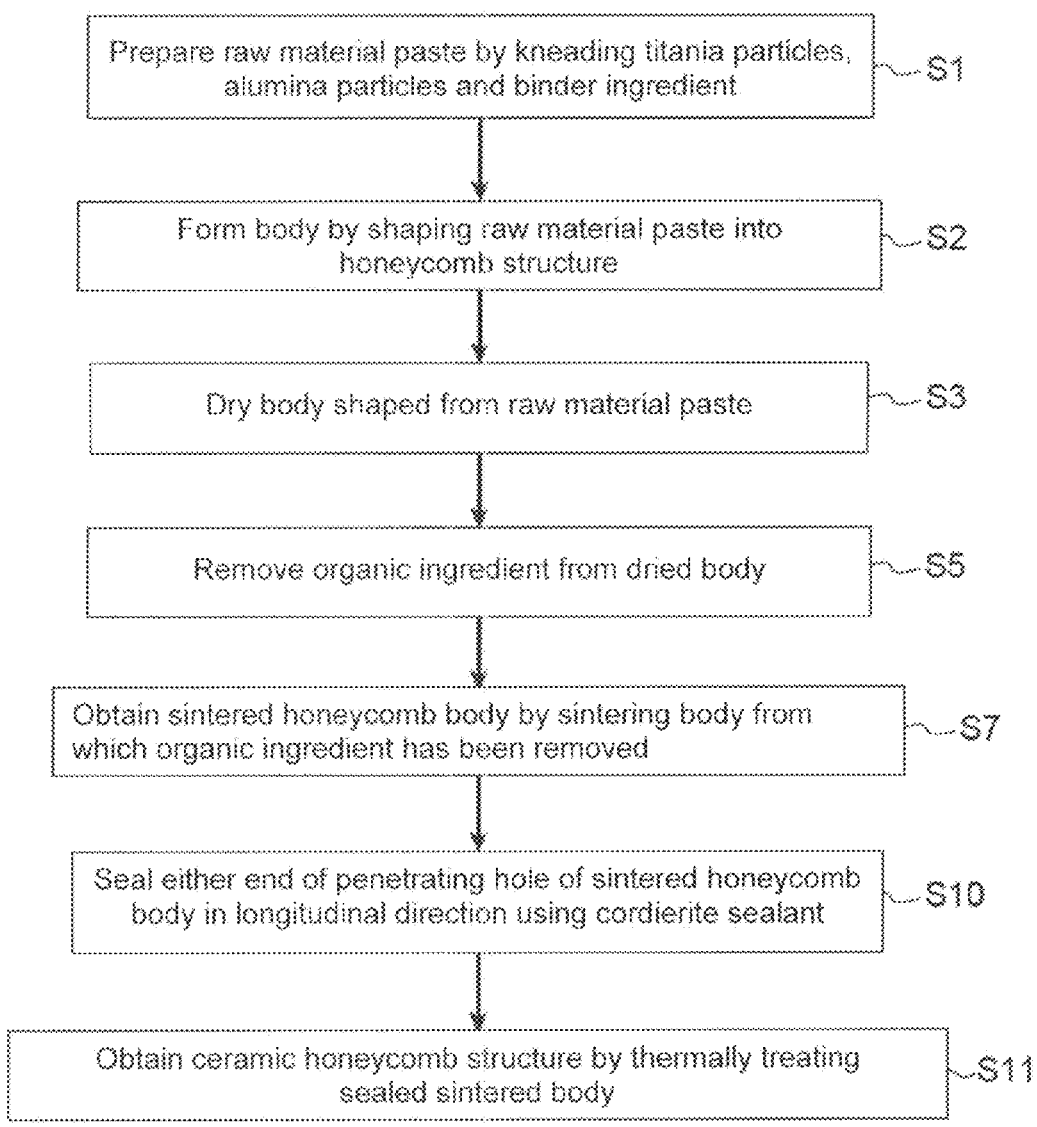
FIG. 6 is a flowchart showing an example of the manufacturing method according to a third embodiment of the present invention.

FIG. 6 is a flowchart showing an example of the method for manufacturing a honeycomb structure according to a third embodiment of the present invention.

As shown in FIG. 6, following is an example of the method for manufacturing a ceramic honeycomb structure: preparation step (S1) for preparing raw material paste by kneading titania particles, alumina particles and a binder ingredient; forming step (S2) to form a body by shaping the raw material paste into a honeycomb structure; drying step (S3) for drying a body shaped from the raw material paste; degreasing step (S5) for removing organic ingredients from a dried body; sintering step (S7) to form a sintered honeycomb body by sintering a body from which organic ingredients have been removed; sealing step (S10) for sealing either end of a through-hole of a sintered honeycomb body in a longitudinal direction using a sealant composition containing aluminum hydroxide particles, talc particles, kaolin particles, water and an organic binder; and thermal treatment step (S11) for thermally treating a sealed sintered body.

However, it is an option not to conduct drying step (S3) and degreasing step (S5) in the method for manufacturing a ceramic honeycomb structure according to the third embodiment.

Sealing step (S10) and thermal treatment step (S11) are respectively described below. As for preparation step (S1), preconditioning treatment step, forming step (S2), drying step (S3), degreasing step (S5) and sintering step (S7), their respective descriptions provided above apply in the same manner.

Sealing of Through-Holes of Sintered Body (S10)

In a sealing step of the third embodiment (hereinafter also referred to as a "sintered body sealing step"), either end of a through-hole of a sintered honeycomb body in a longitudinal direction is sealed using a sealant composition containing aluminum hydroxide particles, talc particles, kaolin particles, water and an organic binder to obtain a sealed sintered honeycomb body.

The weight ratio of aluminum hydroxide particles, talc particles and kaolin particles in a sealant composition is preferred to be as follows: aluminum hydroxide particles/talc particles=0.2~0.3; talc particles/kaolin particles=1.0~1.5; and aluminum hydroxide particles/kaolin particles=0.25~0.36. The weight ratio may also be aluminum hydroxide particles/talc particles=0.21~0.27; talc particles/kaolin particles=1.1~1.4; and aluminum hydroxide particles/kaolin particles=0.27~0.34.

As for the method for applying a sealant to a sintered honeycomb body and the type of sealant or sealant composition in the sintered body sealing step, the description provided above in sealing step (S4) of the first embodiment applies in the same manner.

Thermal Treatment of Sealed Sintered Honeycomb Body (S11)

A ceramic honeycomb structure is obtained by thermally treating a sealed sintered honeycomb body in a thermal treatment step of the third embodiment.

A thermal treatment is not limited to any specific method, and is conducted using a sintering furnace such as an electric tube furnace, electric box furnace, tunnel kiln, far infrared furnace, microwave heater, shaft kiln, reverberatory furnace, rotary-hearth furnace or roller-hearth furnace.

The thermal treatment temperature may be set lower than when a sealant composition is made from the same material as that for raw material paste of a body. For example, it is 1200° C. or higher, and it may be set at 1250° C. or higher. In addition, the thermal treatment temperature is 1450° C. or lower, for example, and it may be set at 1350° C. or lower.

The temperature is preferred to be set at 1200° C. or higher but 1450° C. or lower, since particles in a sealant composition containing aluminum hydroxide particles, talc particles, kaolin particles, water and an organic binder start forming cordierite at approximately 1200° C., and such cordierite particles start incongruent melting reactions at approximately 1450° C.

Thermal treatment for a honeycomb body is conducted under oxygen atmosphere such as atmospheric air, for example.

The duration for thermally treating a sintered honeycomb body differs depending on the amount of sealant composition, the type of sintering furnace, the temperature and atmosphere of thermal treatment and the like. It may be set for 10 minutes~2 hours, for example.

Ceramic Honeycomb Structural Body

A ceramic honeycomb structure as an embodiment of the present invention is obtained by a method for manufacturing a ceramic honeycomb structure according to a first embodiment, a second embodiment or a third embodiment.

Partitions of a ceramic honeycomb structural body can function as a filter to capture particulate matter (PM).

Therefore, a ceramic honeycomb structure can function, for example, as a diesel particulate filter (DPF) or the like.

EXAMPLES

The present invention is further described in detail by the following examples. However, the present invention is not limited to such examples.

Example 1

Eight parts by weight of titania particles with a mean volume particle diameter of 12 µm (brand name $TiO_2$ 3020 (registered trademark), Kronos Incorporated), 16 parts by weight of alumina particles with a mean volume particle diameter of 3 µm (brand name $Al_2O_3$ RMA (registered trademark), Alcan Inc.), 3 parts by weight of silicon dioxide, 20 parts by weight of pore-forming graphite (brand name A625, Asbury Graphite Mills, Inc.), 4.5 parts by weight of methyl cellulose (brand name METOLOSE 60SH, Shin-Etsu Chemical Co., Ltd.) and 18 parts by weight of water are placed in a kneader (brand name Mix Muller, Shinto Kogyo K.K.) and kneaded to prepare raw material paste.

The raw material paste is extruded through a honeycomb die to form a honeycomb structural body having approximately 300 cpsi (approximately 46.5 cell/cm$^2$) with a partition thickness of approximately 0.010 inch (approximately 0.25 mm). The raw material paste is shaped into a body with a diameter of 143.8 mm and a length of 150 mm.

Then, a body is cut to a desired length and dried for 20 minutes using both microwave (2.45 GHz, 20 kW) and hot air (140° C., air speed of 1 m/s).

Next, 2.9 parts by weight of aluminum hydroxide particles, 12.3 parts by weight of talc particles, 9.7 parts by weight of kaolin particles, 4 parts by weight of methyl cellulose and 15 parts by weight of water are placed into a kneader (brand name Mix Muller, Shinto Kogyo K.K.), and kneaded to prepare a sealant composition.

Masking film is put on both end surfaces of the dried body. Then, the masking films are bored into a checkered pattern so that the ceramic honeycomb structural body obtained after sintering is sealed in checkered patterns which are complementary on one end surface and on the other end surface of the ceramic body. Accordingly, a masked body is formed. As for masking film, tape with an adhesive layer (adhesive force of 5.3 N/cm) made by forming acrylic adhesive on a polyester base is used.

The portion of a dried body from an end sealed with masking film to a point 5 mm upward in a longitudinal direction is immersed into a sealant composition. Then, the body is lifted from the sealant composition. In the same manner, the other end of the body in a longitudinal direction is also immersed into the sealant composition and lifted from the sealant composition. Accordingly, a sealed body is obtained.

Under atmospheric air, the sealed body is heated from room temperature to 200° C. at a programmed rate of 40° C./hour; when the temperature has reached 200° C., it is heated to 300° C. at a programmed rate of 10° C./hour; when the temperature has reached 300° C., it is heated to 450° C. at a programmed rate of 40° C./hour; the temperature is kept at 450° C. for 5 hours to degrease the body; and it is heated at a programmed rate of 500° C./hour to 1450° C., where it is kept for 5 hours to sinter the body. Accordingly, a ceramic honeycomb structural body is obtained.

As a result, a ceramic honeycomb body is obtained, sealed using a sealant whose composition is different from that of the body shaped from a raw material paste.

An element analysis is performed on partitions of the obtained ceramic body using a scanning electron microscope (S-4800, Hitachi, Ltd.) and an energy dispersive X-ray spectrometer (EMAX Energy EX-250, Horiba, Ltd.). As a result, the ratio (weight ratio) of titania and alumina in the ceramic body is found in a range of 6:10~5:10, and the ratio (weight ratio) of magnesium oxide, alumina and silica in the sealed portions is each found in a range of 4:10:15.

Example 2

A body formed in the same manner as Example 1 is degreased and sintered under the same conditions as in Example 1 to form a sintered honeycomb body.

Next, 25 parts by weight of cordierite particles (mean volume particle diameter of 2 µm), 4 parts by weight of methyl cellulose and 15 parts by weight of water are placed into a kneader (brand name: Mix Muller, Shinto Kogyo K.K.), and kneaded to prepare a sealant composition.

Masking film is put on both end surfaces of the sintered honeycomb body. Then, the masking films are bored into a checkered pattern so that the ceramic honeycomb structural body obtained after sintering is sealed in checkered patterns which are complementary on one end surface and on the other end surface of the ceramic body. Accordingly, a masked body is formed. As for masking film, tape with an adhesive layer (adhesive force of 5.3 N/cm) made by forming acrylic adhesive on a polyester base is used.

The portion of a sintered honeycomb body from an end sealed with masking film to a point 5 mm upward in a longitudinal direction is immersed into the sealant composition. Then, the body is lifted from the sealant composition. In the same manner, the other end of the body in a longitudinal direction is also immersed into the sealant composition and lifted from the sealant composition. Then, a thermal treatment is conducted at 1300° C. for 10 minutes to obtain a ceramic honeycomb structural body.

An element analysis is performed on the partitions of the obtained ceramic body using a scanning electron microscope (S-4800, Hitachi, Ltd.) and an energy dispersive X-ray spectrometer (EMAX Energy EX-250, Horiba, Ltd.). As a result, the ratio (weight ratio) of titania and alumina in the ceramic body is found in a range of 6:10~5:10.

Example 3

A sintered honeycomb body is formed the same as in Example 2.

Next, the same as in Example 2, both end surfaces of the sintered body are taped with masking film, and the body is immersed into the sealant composition used in Example 1.

The sealed sintered body is thermally treated at 1200° C. for 15 minutes, and a ceramic honeycomb structural body is obtained.

An element analysis is performed on the partitions of the obtained ceramic body using a scanning electron microscope (S-4800, Hitachi, Ltd.) and an energy dispersive X-ray spectrometer (EMAX Energy EX-250, Horiba, Ltd.). As a result, the ratio (weight ratio) of titania and alumina in the ceramic body is found to be in a range of 6:10~5:10, and the ratio (weight ratio) of magnesium oxide, alumina and silica in the sealed portion is approximately 4:10:15.

Obviously, numerous modifications and variations of the present invention are possible in light of the above teachings. It is therefore to be understood that within the scope of the appended claims, the invention may be practiced otherwise than as specifically described herein.

What is claimed is:

1. A method for manufacturing a ceramic honeycomb structure, comprising:

kneading titania particles, alumina particles and a binder ingredient such that a raw material paste comprising the titania particles, the alumina particles and the binder ingredient is prepared;

forming a body comprising the raw material paste and having a honeycomb structure such that the body has the honeycomb structure having a plurality of through-holes extending in a longitudinal direction of the body and a plurality of partition portions formed between the through-holes;

applying a sealant composition comprising aluminum hydroxide particles, talc particles, kaolin particles, water and an organic binder to one end of each of the through-holes of the body in the longitudinal direction such that the honeycomb structure of the body has each of the through-holes sealed at the one end; and sintering the body comprising the raw material paste and having the honeycomb structure sealed by the sealant composition such that a ceramic body having the honeycomb structure and comprising aluminum titanate is formed and that the sealant composition forms a sealant comprising cordierite in each of the through-holes at the one end, wherein the sealant composition has a weight ratio of the aluminum hydroxide particles, talc particles and kaolin particles such that a ratio of aluminum hydroxide particles/talc particles is in a range of 0.2~0.3, a ratio of talc particles/kaolin particles is in a range of 1.0~1.5 and a ratio of aluminum hydroxide particles/kaolin particles is in a range of 0.25~0.36, and the sealant composition is free from fiber.

2. The method for manufacturing a ceramic honeycomb structure according to claim 1, wherein the sealant composition further comprises magnesium hydroxide particles and magnesium carbonate particles.

3. The method for manufacturing a ceramic honeycomb structure according to claim 1, wherein the sealant composition comprises the water, the organic binder and a sealant precursor comprising mixed particles comprising the aluminum hydroxide particles, the talc particles and the kaolin particles.

4. The method for manufacturing a ceramic honeycomb structure according to claim 3, wherein the particles of the sealant precursor further include magnesium hydroxide particles and magnesium carbonate particles.

5. The method for manufacturing a ceramic honeycomb structure according to claim 4, wherein the particles of the sealant precursor are obtained by spray-drying a mixture comprising the aluminum hydroxide particles, the talc particles, the kaolin particles, the magnesium hydroxide particles and the magnesium carbonate particles.

6. The method for manufacturing a ceramic honeycomb structure according to claim 1, further comprising drying the body comprising the raw material paste and having the honeycomb structure.

7. The method for manufacturing a ceramic honeycomb structure according to claim 1, further comprising degreasing the body comprising the raw material paste and having the honeycomb structure such that an organic ingredient in the raw material paste of the body is removed.

8. A method for manufacturing a ceramic honeycomb structure, comprising:

kneading titania particles, alumina particles and a binder ingredient such that a raw material paste comprising the titania particles, the alumina particles and the binder ingredient is prepared;

forming a body comprising the raw material paste and having a honeycomb structure such that the body has the honeycomb structure having a plurality of through-holes extending in a longitudinal direction of the body and a plurality of partition portions formed between the through-holes;

sintering the body comprising the raw material paste and having the honeycomb structure such that a sintered body having the honeycomb structure and comprising aluminum titanate is formed;

applying a cordierite sealant composition comprising cordierite particles, water and an organic binder to one end of each of the through-holes of the sintered body in the longitudinal direction such that the honeycomb structure of the sintered body has each of the through-holes sealed at the one end; and thermally treating the sintered body having the honeycomb structure sealed by the cordierite sealant composition such that a ceramic honeycomb structure having the honeycomb structure and comprising aluminum titanate is formed and that the cordierite sealant composition forms a sealant comprising cordierite in each of the through-holes at the one end, wherein the cordierite sealant composition is free from fiber.

9. The method for manufacturing a ceramic honeycomb structure according to claim 8, wherein the cordierite particles are sintered cordierite particles having a mean volume particle diameter in a range of 0.5 µm~5 µm.

10. A method for manufacturing a ceramic honeycomb structure, comprising:

kneading titania particles, alumina particles and a binder ingredient such that a raw material paste comprising the titania particles, the alumina particles and the binder ingredient is prepared;

forming a body comprising the raw material paste and having a honeycomb structure such that the body has the honeycomb structure having a plurality of through-holes extending in a longitudinal direction of the body and a plurality of partition portions formed between the through-holes;

sintering the body comprising the raw material paste and having the honeycomb structure such that a sintered body having the honeycomb structure and comprising aluminum titanate is formed;

applying a sealant composition comprising aluminum hydroxide particles, talc particles, kaolin particles, water and an organic binder to one end of each of the through-holes of the sintered body in the longitudinal direction such that the honeycomb structure of the sintered body has each of the through-holes sealed at the one end; and thermally treating the sintered body having the honeycomb structure sealed by the sealant composition such that a ceramic honeycomb structure having the honeycomb structure and comprising aluminum titanate is formed and that the sealant composition forms a sealant comprising cordierite in each of the through-holes at the one end, wherein the sealant composition has a weight ratio of the aluminum hydroxide particles, talc particles and kaolin particles such that a ratio of aluminum hydroxide particles/talc particles is in a range of 0.2~0.3, a ratio of talc particles/kaolin particles is in a range of 1.0~1.5 and a ratio of aluminum hydroxide particles/kaolin particles is in a range of 0.25~0.36, and the sealant composition is free from fiber.

11. A ceramic honeycomb structural body produced by the method for manufacturing a ceramic honeycomb structure according to claim 1.

12. A ceramic honeycomb structural body produced by the method for manufacturing a ceramic honeycomb structure according to claim 8.

13. A ceramic honeycomb structural body produced by the method for manufacturing a ceramic honeycomb structure according to claim 10.

14. The method for manufacturing a ceramic honeycomb structure according to claim 3, further comprising drying the body comprising the raw material paste and having the honeycomb structure.

15. The method for manufacturing a ceramic honeycomb structure according to claim 3, further comprising degreasing the body comprising the raw material paste and having the honeycomb structure such that an organic ingredient in the raw material paste of the body is removed.

16. The method for manufacturing a ceramic honeycomb structure according to claim 8, further comprising drying the body comprising the raw material paste and having the honeycomb structure.

17. The method for manufacturing a ceramic honeycomb structure according to claim 8, further comprising degreasing the body comprising the raw material paste and having the honeycomb structure such that an organic ingredient in the raw material paste of the body is removed.

18. The method for manufacturing a ceramic honeycomb structure according to claim 8, wherein the cordierite particles in the cordierite sealant composition have a mean volume particle diameter in a range of 0.5 μm to 5 μm and an amount in a range of 40% to 80% by mass with respect to a mass of the cordierite sealant composition.

19. The method for manufacturing a ceramic honeycomb structure according to claim 10, further comprising drying the body comprising the raw material paste and having the honeycomb structure.

20. The method for manufacturing a ceramic honeycomb structure according to claim 10, further comprising degreasing the body comprising the raw material paste and having the honeycomb structure such that an organic ingredient in the raw material paste of the body is removed.

* * * * *